Nov. 21, 1961 U. C. S. DILKS ET AL 3,009,633

DATA TRANSMISSION SYSTEM FOR ACCOUNTING MACHINES

Filed March 14, 1955 6 Sheets-Sheet 1

INVENTORS
WILLIAM W. DEIGHTON
USELMA CLARKE S. DILKS

BY Raymond B. Parker
ATTORNEY

DATA TRANSMISSION SYSTEM FOR ACCOUNTING MACHINES

Filed March 14, 1955

INVENTORS
WILLIAM W. DEIGHTON
USELMA CLARKE S. DILKS
BY [signature]
ATTORNEY

Nov. 21, 1961 U. C. S. DILKS ET AL 3,009,633

DATA TRANSMISSION SYSTEM FOR ACCOUNTING MACHINES

Filed March 14, 1955 6 Sheets-Sheet 3

SLIDES SHOWN IN COCKED OR RESET POSITION

SLIDES MOVE TO LEFT WHEN TRIGGERED

SLIDES MOVE TO RIGHT WHEN RESET

*INVENTORS*
WILLIAM W. DEIGHTON
USELMA CLARKE S. DILKS

*BY* Raymond B. Parker

ATTORNEY

Nov. 21, 1961 U. C. S. DILKS ET AL 3,009,633

DATA TRANSMISSION SYSTEM FOR ACCOUNTING MACHINES

Filed March 14, 1955

6 Sheets-Sheet 4

INVENTORS
WILLIAM W. DEIGHTON
USELMA CLARKE S. DILKS

BY Ralzemond B. Parker

ATTORNEY

Nov. 21, 1961 U. C. S. DILKS ET AL 3,009,633

DATA TRANSMISSION SYSTEM FOR ACCOUNTING MACHINES

Filed March 14, 1955 6 Sheets-Sheet 5

INVENTORS
WILLIAM W. DEIGHTON
USELMA CLARKE S. DILKS
BY
Ralzemond B. Parker
ATTORNEY Nov. 21, 1961 U. C. S. DILKS ET AL 3,009,633

DATA TRANSMISSION SYSTEM FOR ACCOUNTING MACHINES

Filed March 14, 1955 6 Sheets-Sheet 6

INVENTORS
WILLIAM W. DEIGHTON
USELMA CLARKE S. DILKS

BY Ralzemond B. Parker

ATTORNEY 3,009,633

DATA TRANSMISSION SYSTEM FOR ACCOUNTING MACHINES

Uselma Clarke S. Dilks, Ithan, and William W. Deighton, Paoli, Pa., assignors to Burroughs Corporation, Detroit, Mich., a corporation of Michigan Filed Mar. 14, 1955, Ser. No. 497,901
13 Claims. (Cl. 235—60)

This invention relates to data transmission and control systems, and more particularly to an electromechanical system and components thereof for deriving positional data from machines or for delivering positional data to machines and for controlling the operation of one machine by another from such information.

It is desirable in the operation of systems in which one machine controls another that the sensing of positional data and the transmission and utilization thereof not only be accurate, but be obtained at high speeds and with economy and efficiency. Considerable difficulty has been encountered in the past in the automatic control of one machine by another machine and especially at the relatively high speeds desired at the present time for computation and printing. This is especially true of mechanical equipment from which it is desired to derive data representing the positions of the moving parts at any particular period in the operating cycle or to convey to mechanical equipment incremental information representing the positions desired for the moving parts of such machine and manipulating these parts to the positions desired therefor.

An important object of the invention is to provide an improved information transmission system for converting mechanical positions to electrical signals representative of such positions and for converting electrical signals to mechanical positions, and to perform these operations with a minimum of load on the parts and at speeds which will not be detrimental to the operation of the equipment employed in the system.

Another important object of the invention is to provide an improved system capable of sensing the arbitrary digital positions of a plurality of independently movable members in a machine and converting such positional information into electrical energy and utilizing such energy for controlling the positions of a plurality of independently movable parts of another machine.

Another important object of the invention is to provide improved apparatus for obtaining and storing positional data concerning the movements of parts of a complex machine and for using such stored information for controlling similar or equivalent parts of another machine and at any desired interval of time thereafter.

Another important object of the invention is to provide improved apparatus for entering and storing positional data concerning the movements of parts of a complex machine and for using the stored information for controlling the positions of these parts when the machine is operated.

Another important object of the invention is to provide a system including a secondary or slave machine operated from a primary or master machine and designed for operation at such speeds that there will be no interference with the continuous cycling operations of the two machines at their maximum operating speeds.

Another important object of the invention is to provide improved mechanical correspondence between two machines, one of which drives the other and is located remotely therefrom.

Another important object of the invention is to provide an improved bi-directional control system between two or more separate machines which enables each machine in the system, in the exercise of control over one another, to assume either a master or subservient relation to any other machine in the system.

Another important object of the invention is to provide a novel combined input-output mechanism for a machine and rendering it capable of converting mechanical position to outgoing electrical signals and of converting incoming electrical signals to mechanical motion and using such motion to position the parts of the machine, the mechanism being operated from a common power shaft in the machine.

Another important object of the invention is to provide an improved input-output mechanism for a machine capable of converting mechanical position represented in decimal notation into electrical signals representing such positions in binary notation and capable of receiving electrical signals representing positional information in binary notation and converting the same into mechanical positions represented in decimal notation.

Another important object of the invention is to provide a business machine having cyclical operating periods which is capable of storing the output thereof for time periods after the cyclical operations thereof and for receiving and storing input information before the cyclical operations commence.

The system of the present invention is capable of noting the arbitrary digital positions of a number of actuator members or accumulator racks in a primary or master machine, transmitting pertinent information regarding these positions to a secondary or slave machine, and providing in the secondary machines means for positioning similar or equivalent actuator members or accumulator racks in such a manner as to be indicative of the digital positions of the members noted in the primary machine.

In a system embodying the invention and including two machines, one subservient to the other, it is important that the information concerning the positions of the actuator members of the master machine be accurately determined and that this information be transmitted to the corresponding or equivalent actuating members of the subservient machine. In carrying out the objects of this invention, an important feature of the invention is the manner in which the positional information is derived from certain actuator members of the master machine and is converted into electrical signals in order to provide a relatively simple and inexpensive means for transmitting this information to the subservient machine. Another important feature of the invention is the manner of delivering the electrical signals representing positional information to the subservient machine and of converting the electrical signals into mechanical motion for controlling the movement of certain actuator members in the subservient machine and causing them to assume the assigned positions therein. Another important feature of the invention is the arrangement for embodying in one assembly the mechanism for converting mechanical position to electrical signals and for converting electrical signals into mechanical position and operating the moving parts of the assembly from a common power shaft. In many of the machines to which this invention is applicable space is at a premium, and to this end another important feature of the invention is the design of the data sensing, transmitting and control mechanisms so that the elements thereof may occupy a minimum space and impose a minimum load on the remaining parts of the machine.

Various other objects, advantages and meritorious features of the invention will become more apparent from the following specification, appended claims and accompanying drawings, wherein:

Figure 13:
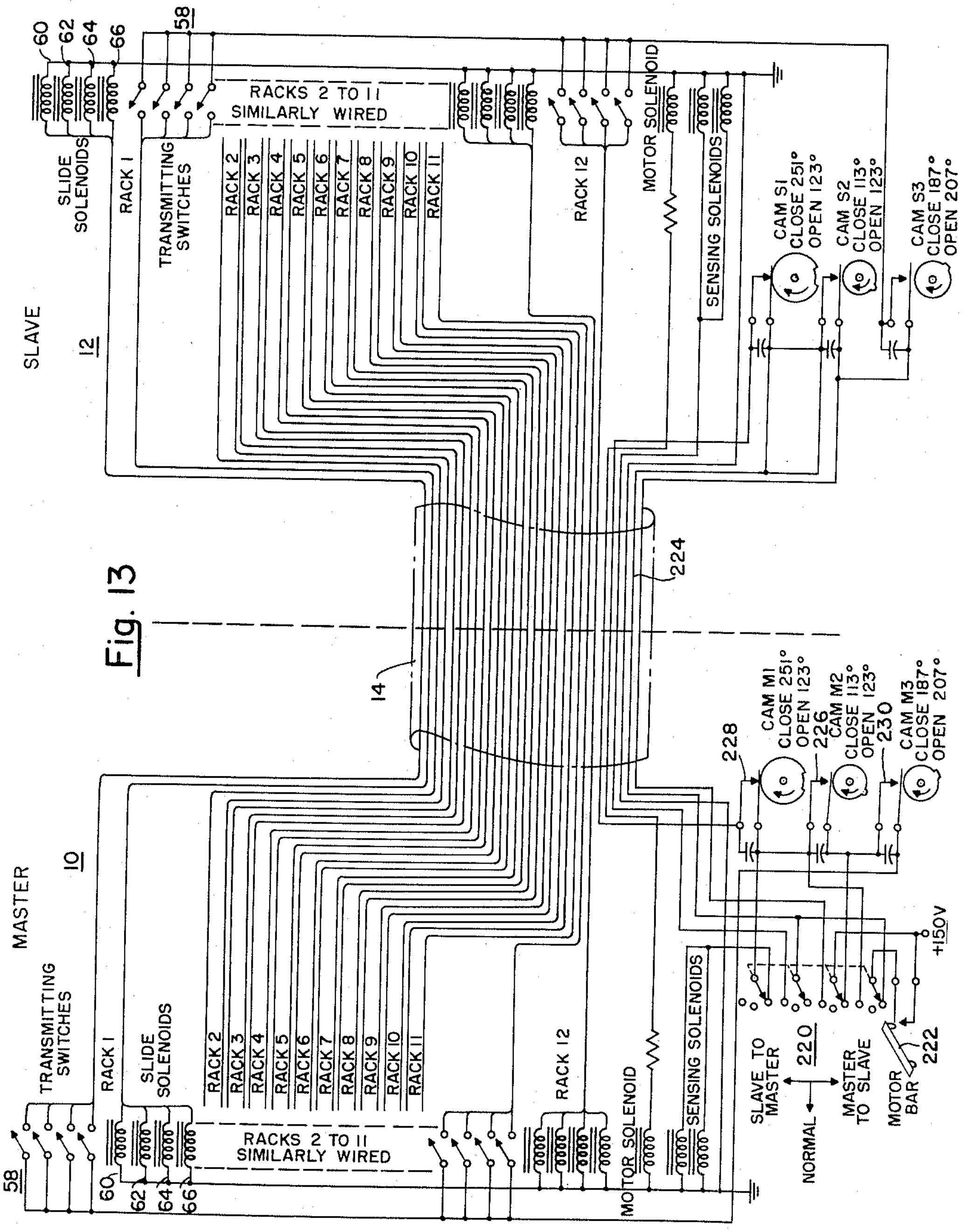
FIG. 13 is a circuit diagram of a system embodying the invention including a master machine and a slave machine and illustrating the circuit control relationship therebetween.

Referring to the drawings, and briefly to FIG. 13, a system contemplated by the invention includes a transmitter generally indicated at 10 and otherwise identified as a primary or master machine, a receiver generally indicated at 12 and otherwise identified as a secondary or slave machine, and a connecting link or cable 14 through which the electric signals from one to the other machine are transmitted. For the purposes of the present description only and to provide a convenient example of one kind of apparatus to which this invention is related, the primary machine 10 and the secondary machine 12 may be similar, but modified in accordance with this invention, to the machine of the character described and claimed in the United States Letters Patent, 2,629,549 issued in the name of T. M. Butler and assigned to the same assignee as the present invention. In order to facilitate the reading and understanding of the description of the present invention, where practical, a reference to similar parts of the patented apparatus will be made and reference characters thereof identified herein.

In accordance with this invention, the primary machine 10 is designed to convert selected mechanical positions of certain of the moving parts thereof into the electrical counterpart of that position, and specifically in the form of electrical pulses, while the secondary machine 12 is designed to be controlled by these impulses and have its corresponding moving parts shifted to similar positions. In the illustrated embodiment of the invention described herein, the two machines are provided with similar input-output mechanisms which enables each to assume a master to slave relationship with respect to the other machine and thus render the control between the two bi-directional. While the illustrated embodiment of the invention is directed to a method and apparatus for linking input and output devices associated with machines of the type described in the aforesaid patent, it is to be understood that the invention is not limited to such machine structure and that the description which follows is applicable to many different types of accounting and computing machines.

Each machine of the embodiment of the invention illustrated herein may be similar to that disclosed in the aforesaid Patent 2,629,549, but modified in accordance with this invention. In the disclosure of said patent, a plurality of vertically movable type bars identified both in the patent and herein at 562 (FIG. 1) are provided, and each type bar carries along its upper portion a plurality of printing types or slugs 561 which may form the numerals "0" through "9" inclusive. The arrangement is such that vertical movement of any of the print bars will align one or another of its printing types with a printing hammer 605, which, when actuated will strike the type brought into its path of movement and cause the latter to make an impression on a recording medium partially rolled around the platen 1057 on the movable carriage 1056 of the machine.

An operative connection is provided at the lower ends of each of the print bars 562 with an individual one of a plurality of horizontally movable actuator members or racks identified in the aforesaid Patent No. 2,629,549 and similarly indicated herein at 511. The form of operative connection is disclosed in the patent as comprising a gear train or cluster including a gear wheel 566 in mesh with the lower end of the associated print bar and also meshing with the associated actuator rack 511. The extent the print bar 561 is raised or lowered depends upon the extent the actuators 511 are moved forwardly or toward the left in FIG. 1 of the present disclosure. The extent of forward movement of each actuator is determined by the indexing or depression of a selected key of the row of keys on the machine's keyboard with which the actuator is associated. Thus, the indexing of a selected key determines the extent of movement of the actuator rack associated therewith. Accordingly, it is the magnitude of the horizontal movement of each actuator rack which determines the numbers which will be printed by the print bar associated therewith. In the machine disclosed in the aforementioned patent, a single print set of the machine therefore includes a type bar 562, a hammer 605 and an actuator rack 511. In the application of the present invention to a machine such as that shown in the aforesaid patent, an input-output assembly is associated with each print set. Hereinafter, the description which follows will concern itself in the main with a single print set of the machine and its associated input-output assembly, it being understood that the description of these parts is equally applicable to the remaining print sets and their associated input-output mechanism, each of which is substantially identical to the one described herein.

From the above description it is evident that the racks are initially indexed by key depression from the keyboard of the machine and that the travel of the racks 511 from an initial reset position to an operating position is determined by the numerical value of the key depressed.

Each machine in the system serving as the illustrated embodiment of the invention herein incorporates two basic functional means for performing both the input and output operations. Each machine may therefore function as either the master or slave to another machine, depending on whether at any given time it is giving out control data or receiving control data. It should be understood that the invention contemplates not only associating the input and the output means together in the same machine but also the use of either means alone in a machine.

Figure 1:
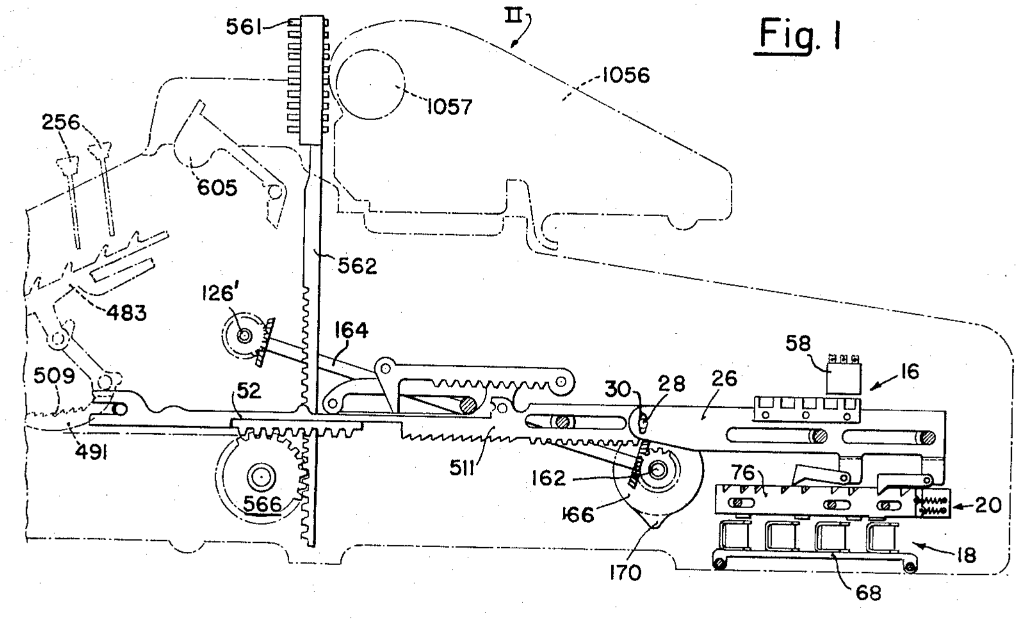
FIG. 1 is a vertical, longitudinal view through a printing calculating machine illustrating the construction and operation of certain parts thereof in accordance with the invention.
Figure 2:
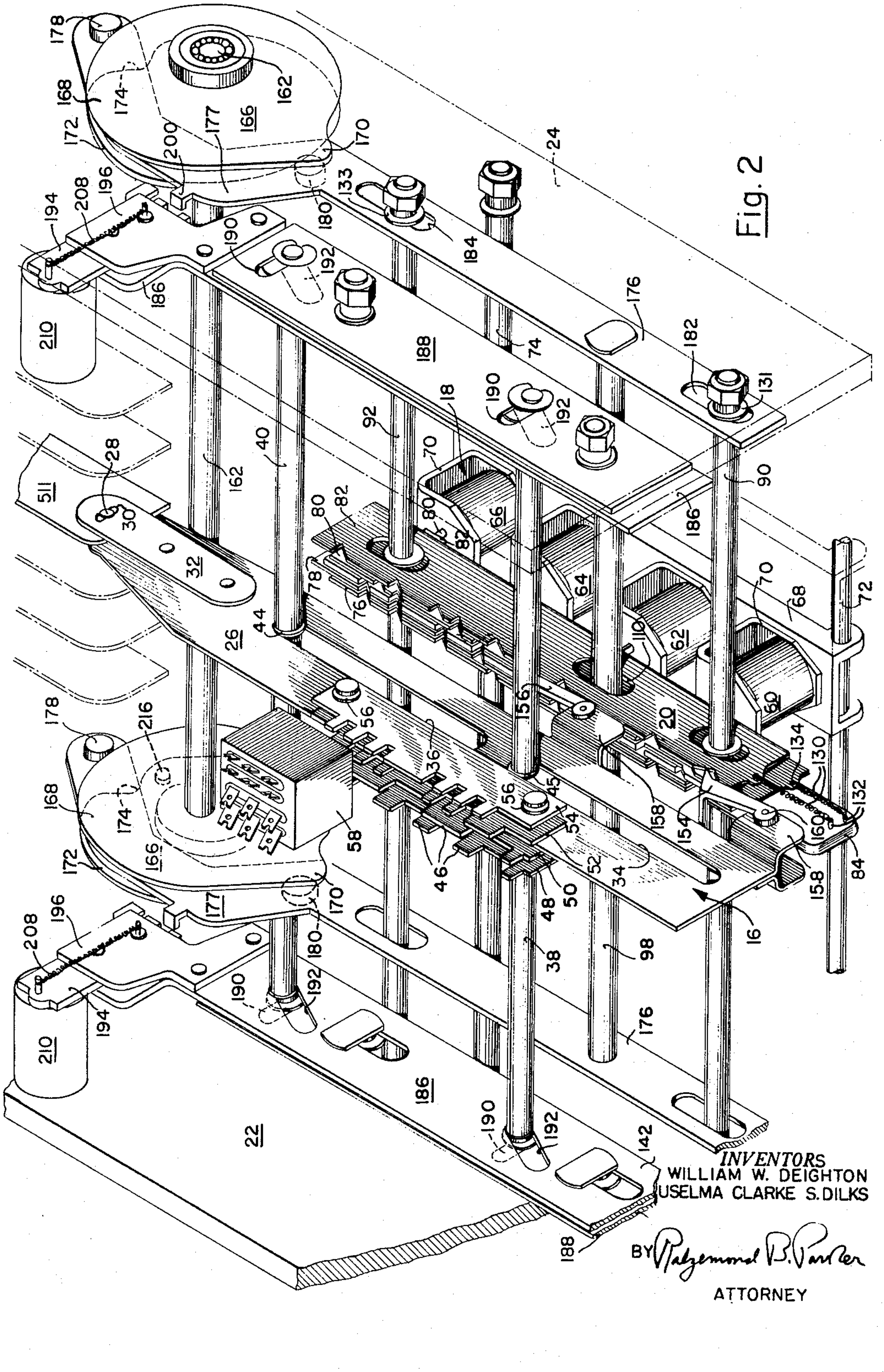
FIG. 2 is an isometric view, partially broken away in section, of an input-output data transmission apparatus embodying the invention.

Referring to FIGS. 1 and 2, a machine of the general character as that disclosed in the aforesaid Patent No. 2,629,549 has been modified in accordance with this invention to have both an input and an output means for the different print sets of the machine. In these two figures, the output mechanism for one of the print sets is generally indicated at 16 and otherwise referred to as the rack position sensing mechanism. The input mechanism for the same print set is generally indicated at 18 and otherwise referred to as the rack position control mechanism. Similar input and output mechanisms are provided for the remaining print sets of the machine. In the illustrated embodiment of the invention, the two mechanisms 16 and 18 for each print set are vertically spaced apart from one another. Positioned between these two mechanisms is a third mechanism generally indicated at 20 and otherwise identified as the sliding rack mechanism. These three mechanisms for each print set may be enclosed within the housing of the machine of the aforementioned patent and preferably as shown in FIG. 1 in an extension to the housing on the rear of the machine. Each actuator rack of the machine is thus provided with an input and an output mechanism, the two being operatively coupled through the intermediate sliding rack mechanism and operated from a common drive shaft as hereinafter described.

Referring particularly to FIG. 2, the side walls between which the input and output mechanisms are disposed are indicated at 22 and 24, the latter being shown in dotted outline. Each rack position sensing mechanism 16 comprises an extension in the form of a slide member 26 attached to the rear end of the rack bar 511 forming part of the print set in which it is incorporated. Preferably this connection is by way of a pin and slot in order to provide vertical movement of the slide member relative to the rack bar. The pin is indicated at 28 and the slot at 30, the latter being in a vertical direction so as to permit the slide member to be raised and lowered relative to the rack bar. As shown in FIG. 2, the connection of the slide member to the rack bar may be assisted by a metal strap or link identified at 32.

The slide member 26 is provided with two aligned, longitudinally extended slots 34 and 36 opening therethrough. Transverse bail rods 38 and 40 extend through the slots and have their ends supported for vertical movement, as hereinafter described. By virtue of the elongation of the slots 34 and 36, the slide rack member 26 is capable of sliding over the two bail rods in a fore and aft direction. In the operation of the machine the slide member 26 of each print set moves jointly with the rack bar 511 with which it is associated and the extent of its movement is determined by the key indexed on the keyboard. To facilitate sliding movement of the slide member 26, the two bail rods 38 and 40 are provided with bushings 45 and 44, respectively, located in the slots 34 and 36 and upon which the member rides.

Carried by the sliding member 26 of each print set are toothed elements which form a code representative of the position of the member and its rack bar. The tooth elements project beyond one edge of the sliding member 26 and by relative movement between the member and a bank of switches the tooth elements are caused to engage the switches and convert the mechanical position of the rack bar to electrical signals. More specifically, the tooth elements form upwardly projecting portions or tabs 46 of four plates identified at 48, 50, 52 and 54 and carried by the slide member 26 in parallel side-by-side relationship thereto, as shown in FIG. 2. The four toothed plates are disposed in two pairs on opposite sides of the slide member and slightly spaced apart from one another and from the slide member and are secured in this manner to the slide members by bolts 56—56 extending transversely therethrough. As will be described in detail more fully hereinafter, the teeth on each side plate are non-uniformly spaced apart from one another to form a code which with the cooperation of electrical switches will convert mechanical position in decimal notation to electrical pulses representing such position in binary notation. As indicated in FIG. 2, the teeth 46 need not be uniform in width, instead some teeth have a longer dimension in the direction of the longitudinal dimension of the slide member than others.

The projecting teeth of the plates 48—54 of each slide member 26 are arranged to be brought into contact with switches housed within a unit identified at 58. The details of the construction of the switches and their operation by the projecting teeth will be brought out in more detail hereinafter.

Figure 3:
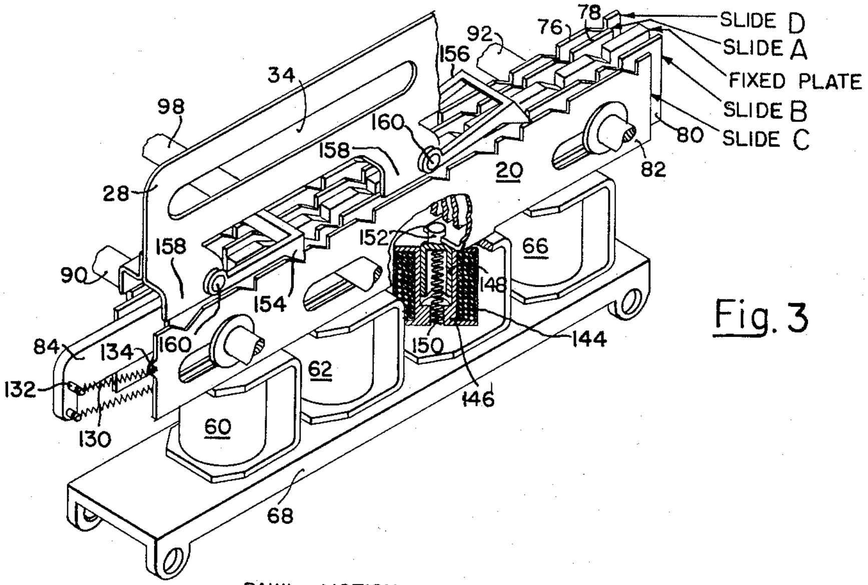
FIG. 3 is an isometric view of the portion of the device illustrated in FIG. 2 showing another position of the coded slide input mechanism thereof.

The input or rack control mechanism 18 for each print set comprises in the illustrated embodiment of the invention four indexing solenoids 60, 62, 64 and 66. The solenoids are arranged in a row and rigidly secured to an elongated platform 68 such that the respective axes of the solenoids extend perpendicular to the platform. If need be, to improve the immobility of the mounting for the solenoids, each solenoid may be enclosed with a U-shaped yoke or bracket 70 which is directly secured to the platform. The platform 68 may be supported in the machine by connection to transverse supporting members or rods 72 and 74. The solenoids, as shown in FIGS. 2 and 3, are arranged in a row below and in the plane of the slide member 26 of the print set with which they are associated. It is understood that each print set of the machine has four such solenoids.

Figure 4:
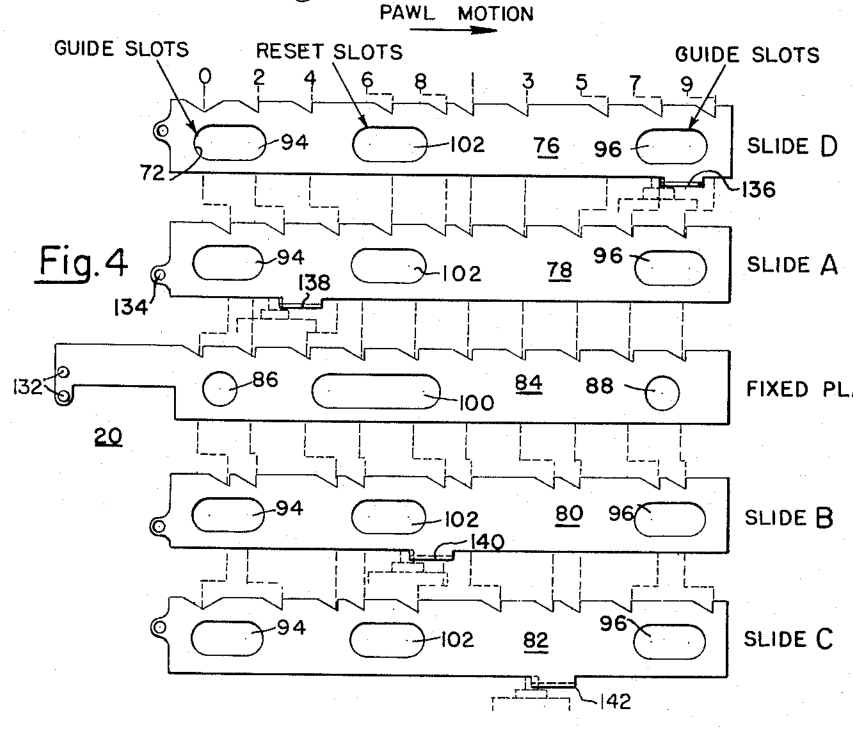
FIG. 4 is a side elevational view of the bars of the coded slide assembly utilized in the illustrated embodiment of the invention.

The sliding rack mechanism 20 of each print set of the machine is located between and operatively coupled to the input control mechanism including the row of solenoids 60—66 and the output slide member 26. The sliding rack mechanism comprises four movable notched coded slides 76, 78, 80 and 82, two on either side of a fixed notched coded plate 84, as shown in FIGS. 2 and 3. The five members 76 to 84 are compactly assembled in side-by-side relation. The upper edges of these members are notched or otherwise cut away in accordance with a code. In a particular embodiment of the invention illustrated herein the slides are cut in accordance with the excess three binary code. The four slides are provided to represent in this code the digits "1," "2," "4" and "8." Side elevations of the slides with their respective notches together with the fixed plate 84, are indicated in FIG. 4. In this figure and also in FIG. 3, the slides 76, 78, 80 and 82 are otherwise identified by the letter characters "D," "A," "B" and "C."

The fixed plate 84 is provided with two circular apertures 86 and 88 one near each end thereof which serves to mount the plate on a pair of transverse rods 90 and 92. The supporting rods 90 and 92 slidingly fit the holes 86 and 88 to support and hold the plate 84 against movement relative thereto. The same rods pass through correspondingly positioned elongated slots 94 and 96 of the movable notched slides 76—82. The slots 94 and 96 are elongated in a longitudinal dimension of the notched slides and permit the latter to have a limited freedom of movement relative to the rods in the fore and aft direction of the machine.

A third transverse rod 98 is associated with each sliding rack mechanism 20 and extends through the fixed and sliding plates thereof in the same direction as the other two rods 90 and 92. Shaft 98, however, is reciprocably bodily movable in a fore and aft direction of the machine and in the longitudinal dimension of the sliding members, as will be described hereinafter, and serves to reset the coded slides following each cycle of operation of the machine in which they are used. To allow for the movement of the rod 98, the fixed plate 84 of the mechanism is provided with an elongated slot 100, as shown in FIG. 4. The movable coded slides 76—82 are provided with registering elongated slots 102 similar in dimensions to one another but shorter than the slot 100 of the fixed plate. It is thus apparent from the description of the sliding rack mechanism that the middle plate is held against movement while the two pairs of coded slides on opposite sides thereof are permitted to have a limited bodily movement in the direction of their longitudinal dimension. The complete assembly is mounted on the three rods 90, 92 and 98. Each print set of the machine is provided with a sliding rack mechanism of this character which is positioned between the input and output mechanisms thereof.

The details of construction of certain of the elements making up the three mechanisms 16, 18 and 20 and their general relation to one another have been described. Their separate functions in the machine and the construction and arrangement of the parts for accomplishing these functions will first be considered hereinafter and followed by a description of how these mechanisms are both physically and operatively associated together and driven from a common power shaft. The read-out or output mechanism including the slide member 26 and associated toothed coded plates 48—54 of each print set are sensed against a bank of switches herein shown at 58. This is accomplished by a relative movement between the slide member and the switch bank. In the illustrated embodiment of the invention the slide member and its associated coded elements 48—54 are moved toward the switch bank 58 for the sensing operation, and since in this embodiment of the invention the switch bank is above the slide member, this movement is in an upward direction, as will be noted by a comparison of FIGS. 9 and 10.

Mounted within the switch bank 58 are a plurality of switches each capable of closing two separate circuits. In the illustrated embodiment of the invention four switches are employed, one for each coded plate or strip 48—54. Thus each switch unit 58 contains four switches each arranged for sensing an individual one of the toothed plates carried by the slide member. The switch bank housing is formed of insulative material and hollowed out interiorly to provide spaces for the switch assemblies.

Figure 6:
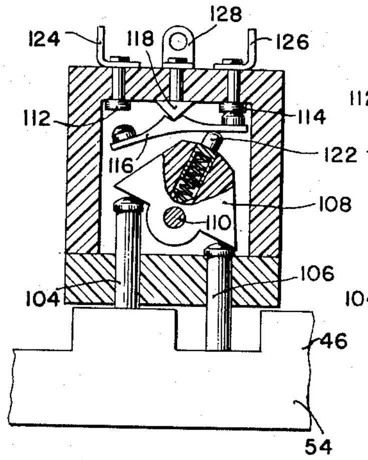
FIGS. 6 and 7 are vertical sectional views through the binary switch mechanism employed in the embodiment of the invention illustrated herein and showing different positions assumed by the mechanism.
Figure 7:
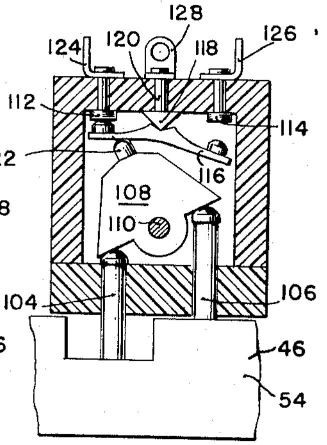
Figure 8:
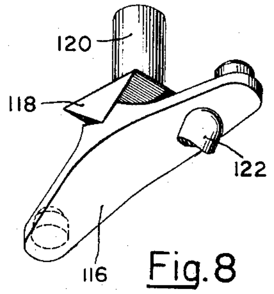
FIG. 8 is a perspective view of the switch contactor in the switch mechanism illustrated in FIGS. 6 and 7.

Referring to FIGS. 6, 7 and 8, each switch assembly in the unit 58 is provided with a pair of projecting pins or plungers 104 and 106. Each switch assembly is mounted in the switch unit 58 so that the plungers depend downwardly from the under side of the unit and into the path of movement of one or the other of the pairs of the coding strips 48—50 or 52—54. In order to show this relationship, the tooth elements of the two coding strips 48 and 50 are shown in section in FIGS. 6 and 7. Interiorly of the switch assembly is a switch actuator 108 which in general exhibits a truncated formation. The actuator is pivoted about an axis formed by pin 110 and shouldered on opposite sides of the pin for engagement by the plungers. It is evident that the depression of one plunger into the switch housing, such as being lifted by one of the teeth 46, will cause the actuator member 108 to rock around its axis and project the other plunger from the switch housing.

Included in each switch mechanism are a pair of contact buttons 112 and 114 located on the side thereof opposite to the plungers 104—106 and arranged to be alternately closed and opened by a rocking contactor 116. The latter is mounted in the switch assembly for pivotal movement by means of a cradle 118 disposed centrally between the contact buttons. The cradle is secured to the switch housing by means of a post 120. The cradle and post are formed of electrically conductive material. The contactor 116 has its half sections extending in two directions at an obtuse angle to each other and such that when in contact with one button it is out of contact with the other. The actuator 108 is operatively coupled with the contact member 116 in such a manner that the rocking movement of the former is transmitted to the latter bringing one end or the other end of the contactor into engagement with one or the other of the buttons 112—114. For this purpose a spring pressed plunger 122 is provided in the apex end of the rocking member which is projected into slidable engagement with the contactor 116 and as it rocks causing the latter to swing one way or the other and engage one or the other of the contact buttons. Comparison of FIGS. 6 and 7 will show the two different circuit closing positions of the switch assembly. It is thus apparent that depression of one pin of each switch will close one circuit and open the other, while contrarywise, depression of the other pin will open one contact and close the second contact.

The circuit connections to each switch of the switch bank 58 are by means of conductive terminals 124 and 126 which are connected to the contact buttons 112 and 114, respectively, and a centered terminal 128 which is connected to the post 120. Depending upon which of the two terminals are closed by the contactor 116, the circuit through the post is conducted by the contactor to the engaged button and out through its respective terminal.

The switches in the switch bank 58 may be connected, as will be more fully described hereinafter, by separate leads to slide control solenoids similar to that shown at 60—66 of a rack stop mechanism of a remotely located slave machine. The switches are adapted to be set by the coded strips in binary form corresponding to the position of the actuator rack. It is thus evident that the position of the actuator may be stored in the switches and delivered when wanted to the slave machine. The information storage results from the fact that when the coded strips 48—54 are sensed by the switches the latter are left set until called upon to change their previous setting. Usually the sensing of the coded strips will occur during a dwell in the movement of the actuator rack.

As previously described, beneath the slide member 26 are the four coded slides 76—82, two on either side of the fixed plate 84. The upper edges of these series of plates are cut away, as best shown in FIG. 4, to form notches which, except for an exception hereinafter noted, are generally alike in shape and direction of inclination. The notches are located at different positions along the upper edges of the movable slide members, and as illustrated herein, in accordance with the excess three binary decimal code. Since four binary digits are all that is necessary to represent decimal numbers from zero to nine, the four slides 76—82 are employed in this embodiment of the invention, one for each binary digit. Each slide has ten notches, one per decimal number, and is used for all ten numbers in either of two positions as will become apparent hereinafter. The fixed plate 84 likewise has ten notches but these are equally spaced apart. The fixed plate is preferably made of heavier material than the movable slides as indicated in order to withstand the impact of pawls engaging in the notches as later described herein.

Each of the movable slides 76—82 has two operative positions, a triggered position and a cocked or reset position. In the triggered position each slide is held at the limit of its travel by a spring 130 (FIGS. 2 and 3) which is attached at one end to a projection 132 on the rear end of the fixed plate 84 and at the other end to a pin 134 on the respective movable notched slide. In the cocked or reset position the slides are held away from its triggered position under tension of its associated spring 130 by the reset bail 98 previously described, the latter moving forwardly of the machine for the resetting operation and carrying the movable slides therewith.

Figure 5:
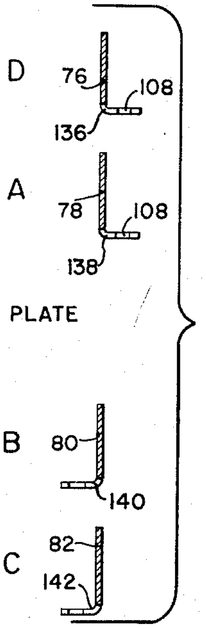
FIG. 5 illustrates transverse sectional views through the slide members of FIG. 4 with each sectional view disposed opposite the slide member of FIG. 4 which it represents.

Integral with each movable notched slide and depending from the lower edge thereof is a projection which is inturned laterally to form a bent lug or ear. The ears for the respective movable slides 76, 78, 80 and 82 are indicated at 136, 138, 140 and 142, respectively. FIGS. 4 and 5 show the respective positions and shapes of the ears of the slides. As shown in FIG. 5, each ear is bent perpendicular to the vertical plane of its respective slide member and projects inwardly and overlaps upon the plane of the fixed plate 84. Each ear is provided with a recess or notch 108 which may be of semicircular configuration to receive a cylindrical pin or plunger as hereinafter described.

As previously described herein, the solenoids 60—66 are mounted in a row below the sliding rack mechanism 20 of their respective print set and with their axes extending vertically in the plane of the fixed plate 84. Each solenoid, as best indicated in FIG. 3, comprises a winding 144 surrounding a fixed core of magnetizable material 146 which is hollowed out and receives a movable armature or pole piece 148. The armature is urged by a spring 150 in an upward direction. Carried on the upper end of the armature is a cylindrical shaped pin 152 which is shaped to be received in recess 108 of an ear of one of the movable slides in the manner indicated in FIG. 3. When each solenoid is de-energized the coil spring urges its respective plunger upwardly and when the slides are in their cocked position each pin 152 of the solenoid will be in engagement with the ear of its particular slide holding the same against movement in the direction urged by its associated spring 130. However, when the solenoid is energized the armature is retracted thereinto releasing the pin from engagement with the ear and permitting the notched slide which it has heretofore been restraining against movement to advance in the direction urged by the coil spring 130.

As previously mentioned, the movable notched slides are reset to cocked position by the reset bail 98. This bail in its forward movement carries the slide members therewith relative to the fixed plate 84 and until the pins of the plungers 148 again latch on to the ears 136—142 of the movable notched slides. In the illustrated embodiment of the invention the total travel of each notched slide from the reset position to the triggered position is .2094 inch, but the reset bar moves the slides forward an extra .035 inch to provide a latching lead for each of the solenoids. Each ear of a notched slide presents a flat face to the pin 152 of its respective solenoid which is long enough in its direction of movement to prevent the spring urged pin to ride off of the face at any time except when the slide is reset and the pin is projected into the recess of the ear to cock the slide.

By selective energization of one or more or all of the solenoids, it is possible to permit travel of one or more or all of the notched slides to assume positions with respect to the fixed plate 84. In any triggered position of these slides there will be one set of notches completely across the slide mechanism which will be in registration. Thus it is possible by judicious energization of the solenoids to set the movable slides in any one of a number of positions signifying in binary code a decimal position of the actuator bar and associated parts of the machine.

Means is provided for operatively coupling the sliding rack mechanism 20 with the slide member 26 and its associated actuator rack 511 and for controlling the position of the slide member in accordance with input data furnished in the form of electrical pulses to the row of solenoids 60—66 of each print set of the machine. In the illustrated embodiment of this invention this means comprises a pair of pawls 154 and 156 which are engageable in the notches of the stationary and movable slides 76—84. A pivoted mounting for each pawl consists of a downward opening U-shaped bracket 158 to which the pawl is pivotally mounted about a transverse horizontal axis such as indicated at 160. The pawls are thus capable of vertical swinging movement and may be yieldingly urged by springs (not shown) into engagement with the notched upper edges of the rack slide mechanism. In the triggered and cocked positions of the movable notched slides, no transverse series of notches of the rack slide mechanism are in registration. Otherwise in any adjusted position of the slides at least one registering transverse series of notches will be provided into which either the pawl 154 or the pawl 156 may be urged. The pawls 154 and 156 illustrated herein are of the compression type, that is, the motion of the actuator rack and associated slide member is such as to put the pawl under compression when it is driven into a notch. In lieu of this, a hood type of pawl may be used whereby the pawl and its associated parts will be put in tension when the pawl is stopped by a notch.

Since the pawls 154 and 156 are pivoted to the lower portion of the slide member 26, it is evident that when the movable slides 76—82 are so positioned that one set of registered notches appears one of the pawls as it is moved along the top edges of the sliding rack mechanism will be permitted to fall within the registered notches and stop the slide member from further movement. This stoppage of the movement of the slide member will be transferred to the associated actuator rack and that in turn will set the position of the print bar at a position to print a number corresponding to the position of the actuator bar. It is thus apparent that by pulsing the solenoids 60—66 in binary code to determine the position of the slide member and its associated actuator rack in decimal notation and to have such position transferred to the printing mechanism of the machine where a permanent print of the number may be made.

When an impulse of current is applied to a solenoid, its associated slide is allowed to move under spring pressure to the triggered position. It is when combinations of these slides are in their triggered positions that appropriate notches are lined up across the slides for the pawl to fall into. Due to the uneven notching in the individual slides, when only one group of notches is lined up across the slides the areas between the notches on the slides provide lands over which the pawls can travel to reach the aligned notch. When the slides are all in either the cocked position or in triggered position, there is no transverse group of notches lined up and the pawls can freely travel from their rest position to their maximum excursion over the lands. Then when it is desired not to use the coded slide rack-stop mechanism to stop the actuation rack but rather the accumulator wheels or the keyboard of the machine, the slides are held in the cocked or reset position.

The notches in the slides are so arranged that for the numbers that a particular slide is used in the triggered position there are notches so placed that they line up with notches in the fixed plate that represent those numbers. When the slide is used in the reset position to represent a number, other notches line up with the appropriate notches in the fixed plate. For example, in FIG. 3, slides 78 and 82 (A and C) are shown in the triggered position with their appropriate notches lined up with the "2" notch in the fixed plate while slides 80 and 76 (B and D) remain in the reset position with their notches also lining up with the "2" notch in the fixed plate. In this figure, the rear pawl is down in the aligned notch while the front one is held up by the lands provided by the slides B, C, and D and the fixed plate.

It will be noticed in FIG. 4 that there are double sloped notches at the "0" position in the C and D slides. These double notches are provided to cam the rear pawl out of the "0" notch whenever either slides A, B and C for number "4" or A, B and D for number "8" are triggered. This camming action is necessary because of the short distance between the rest position of the pawl and the "0" notch and because of the relative motions of the slides when triggered. The pawl in its rest position is .015 inch back of the "0" position and held out of the "0" notches by the lands provided by the A and B slides. When the A and B slides are triggered, the pawl falls part way down into the "0" notch due to the sloping side of the notch. The advance of the add rack causes the pawl to move .015 inch more and bottom in the notch. However, if either the C or D slide is triggered along with the A and B slides, the pawl would still into the "0" notch. The double slope on the C and D slides cams out the pawl and provides a land for the pawl to travel on to the proper notch. The double notch is necessary in the present arrangement since the slides do not move simultaneously even though their triggering solenoids receive simultaneous impulses.

In FIG. 3 it is noted that slides A and B are next to the fixed plate 84 while C and D are farthest away. This arrangement was selected for the reason that the A and B slides most often provided lands for each pawl when it goes from its rest position to each uncovered notch in turn. The A slide provided lands over undesired notches five times, the B slide four times, and the C and D slides twice each. The A and B slides were placed next to the fixed plate so that the pawl would be supported in its center by the lands more often than near its edge. This tends to prevent the pawls from tipping or twisting and possibly hanging up in the wrong notch as they move over the slides. As an additional insurance against tipping or cocking, the pawl bearings are spread apart as far as possible.

The excess three binary decimal code employed herein to index the slides of the rack-stop mechanism is as follows:

| Decimal number: | Excess 3 binary equivalent |
|---|---|
| 0 | 0011 |
| 1 | 0100 |
| 2 | 0101 |
| 3 | 0110 |
| 4 | 0111 |
| 5 | 1000 |
| 6 | 1001 |
| 7 | 1010 |
| 8 | 1011 |
| 9 | 1100 |

In the illustrated embodiment of the invention, both the read-out and the read-in mechanisms are provided in a machine which is capable of printing the data to be transmitted by the machine and the data received by the machine. A characteristic of the type of machine herein described is its cyclical operation which is determined by the rotation of a main drive shaft in the machine identified at 126′ in FIG. 1, and corresponding in function to the main drive shaft 126 of the aforesaid Butler patent. The mechanical parts of the read-in and read-out mechanisms are directly driven from a cam shaft 162 which in turn receives its torque from the main drive shaft and may be journaled, as shown in FIG. 2, in the side wall portions 22 and 24. Any suitable means may be employed for coupling the two shafts together, such as the connecting shaft 164 having bevel gears on each end engaging similar gears on the two operating shafts.

The cam shaft 162 rotates jointly with the main shaft and normally continuously rotates therewith during the operation of the machine. Since duplicate devices are employed on opposite sides of the machine to actuate the mechanical elements of the read-out and read-in mechanisms from the shaft 162 and its cams, similar reference characters will be used for like parts. As shown in FIG. 2, two cams 166—166 are carried by the shaft 162 adjacent to the side walls 22 and 24 of the machine. Each cam is formed with two peripheral sections separated by a circular recess or groove. One peripheral section is indicated at 168 and is provided with a camming rise or protuberance 170. The other peripheral section is indicated at 172 and is provided with a recessed area or depression 174 complementing the rise 170 and located 180° therefrom. Insofar as the two cams are concerned, the camming and depressed areas thereof bear the same angular relation to their axis of rotation as indicated in FIG. 2.

Extending along each side wall is a reset member or slide 176. Each slide is normally straight for the major portion of its length but is provided with a generally C-shaped portion 177 which extends through the recess separating the two peripheral sections of the cam offset relative to the hub of the cam in the manner shown in FIGS. 2, 9 and 10. Two cam engaging rollers are carried by the C-shaped portion 177 of the reset slide, one of which is indicated at 178 and engages the peripheral section 168 and the other of which is identified at 180 and engages the peripheral section 172. The result is that as the cams rotate, the two reset slides are reciprocated in unison toward and away from the shaft 162. The reset slides are supported in this movement by the two supporting rods 90 and 92. For this purpose the two reset slides are provided with elongated slots 182 and 184 through which the rods extend to provide the support yet permitting the reciprocating movement of the slides.

The reset bail rod 98 which moves the notched slides 76—82 to cocked position has its opposite ends joined to the two reset slides 176—176. It is evident that movement of the reset slides in the direction of the cams will bodily shift the bail rod 98 therewith and reset the notched slides.

Above each reset slide 176 is a sensing slide 186. Along the outer face of each sensing slide is a fixed plate 188. Each plate may be rigidly secured to the adjacent side wall of the machine. The sensing slide has a permitted slidable movement toward and away from the cam shaft 162. A feature of the invention which is described in detail hereinafter is the provision for disconnectibly coupling the sensing slide to the reset slide for joint reciprocating movement therewith.

The two sensing bails or rods 38 and 40 upon which the slide member 26 is guided for movement extend through slots in each sensing slide 186 and the adjacent stationary side plate 188. The slots in the fixed plates are indicated at 190 and extend vertically thereby permitting the bails 38 and 40 to have a vertical movement. The slots in the sensing plates, identified at 192, are inclined or slanted in an upward and rearward direction. These serve as camming slots, acting when the sensing slides are moved forward to cause the bails 38 and 40 to ride up the inclined slots since the bails are restrained by the vertical slots 190 from following the movement of the sensing slides. The result is that the bails are lifted as the sensing slides move forward and are lowered when the slides return. This is evident from a comparison of FIGS. 9 and 10 wherein the bails 38 and 40 are shown at their extreme lower and upper positions of movement. The lifting of the bails 38 and 40 will raise the slide member 26 and the sensing plates 48—54 into engagement with the plungers of the switch assemblies in the switch unit 58, as previously described. Return movement of the sensing slides 186—186 will, of course, lower the slide member and switch sensing plates. As previously described, the pin and slot connection 30—32 between the slide member 26 and the actuator bar permits the former to be raised and lowered relative to the bar in any position in which the two may be jointly longitudinally adjusted.

The sensing movement may be discontinued while other movements of the parts continued to recycle with the main shaft and then when sensing operation is wanted the sensing slides 186—186 are coupled to certain moving parts connected to the main shaft to receive power for movement therefrom. This is accomplished in the illustrated embodiment of the invention by the provision of a latch on each sensing slide which is capable of coupling the sensing slide to the reset slide 176 for joint reciprocable movement therewith. The latch mechanism is shown in detail in FIGS. 11 and 12 and more generally in FIGS. 2, 9 and 10. A latch mechanism is carried by each sensing slide 186 and comprises a movable latch member, identified herein at 194, capable in one position of interengaging with the sensing slide and coupling the two together for joint movement. The latch member 194 is carried on the forward end of each sensing slide and over the C-shaped portion thereof. It is guided for vertical movement between the forward end of the sensing slide rearwardly of the latch and cooperating with the member to provide a slidable fit for guiding the latch. A disconnectible coupling is provided between the latch and the reset slide 176 in the form of a notch 198 on the bottom end of the latch and an upwardly projecting lug 200 on the slide. Downward movement of the latch will interengage the lug in the notch and couple the two slides together for joint movement.

The latch 194 of each latching mechanism is guided in its up and down movement by a vertical slot 202 therein through which extend two vertically spaced crossing pins 204—204 fixed in the forward end of the sensing slide and the cooperating plate 196. A third pin 206 is secured to the upper end of the latch in lateral projecting relation thereto. A coiled spring 208 connects the pin with one of the fixed pins 204 and is tensioned to pull the latch downwardly and interlock with the projection 200 on the reset slide.

The coupling operation between the sensing and reset slides is preferably accomplished electrically in order that it may be controlled remotely. Each latch mechanism is provided with a control solenoid 210 having a retractable pole piece 212 which is spring urged outwardly into engagement into a hole 214 in the latch located forwardly of the spring 208. At the upper limit of its travel the hole 214 of the latch is brought into registration with the pole piece of the magnet and the latter is urged by its spring thereinto to hold the latch from downward coupling movement. However, when the solenoid is energized the resultant retraction of the pole piece will release the latch for downward movement in the direction urged by the spring 208.

Figure 11:
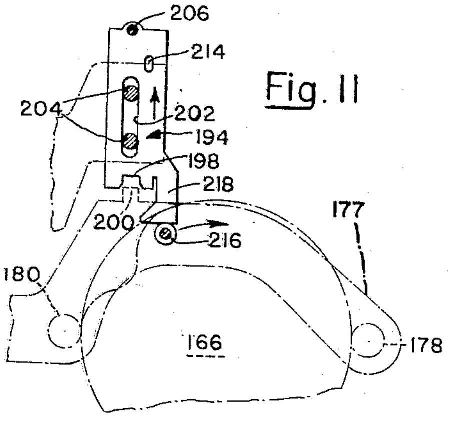
FIG. 11 is a fragmentary view illustrating the manner of decoupling the sensing mechanism from the power shaft.
Figure 12:
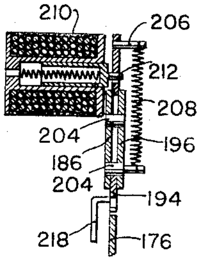
FIG. 12 is a vertical sectional view through the latching mechanism taken along the line 12—12 of FIG. 9.

Carried by each cam 166 is a pin 216 which is adapted to engage foot extension 218 on the bottom end of the latch and raise the latch to the position where it can be engaged by the solenoid pole piece. This will engage once every cycle of the operation of the machine provided that the latch has been lowered into coupling position. The construction and operation of the pin 216 and cooperating foot extension 218 is shown in FIG. 11. If the latch should not be lowered, it is understood that the pin would not strike the foot and no such action will occur. Once decoupled from the reset slide, the associated sensing slide will assume its rest position shown in FIG. 2 and will not be moved until the latching solenoid is pulsed.

Figure 9:
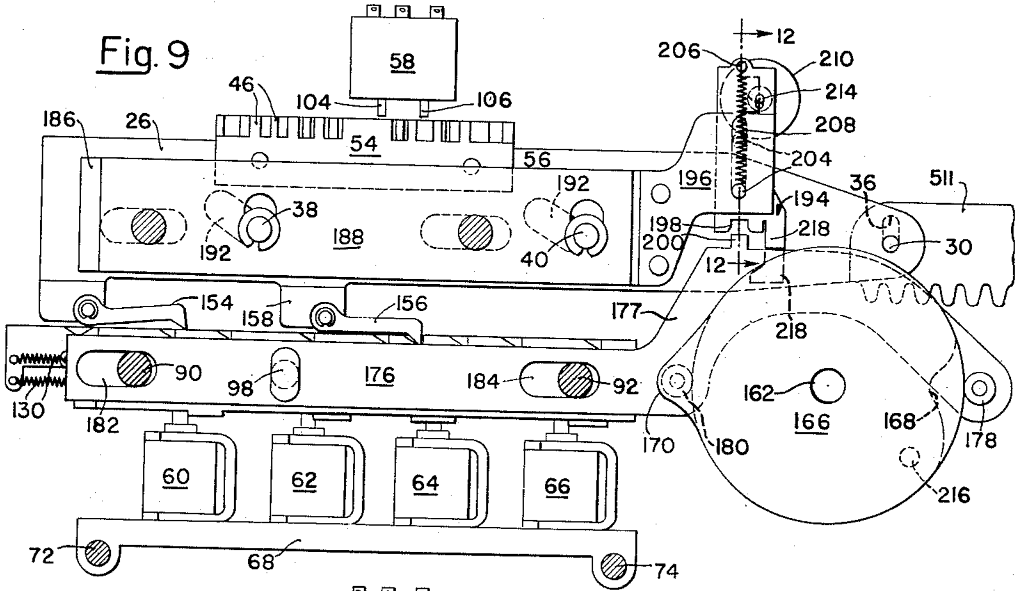
FIG. 9 is a side elevation of one of the input-output data mechanisms showing a position of the parts prior to a sensing operation.
Figure 10:
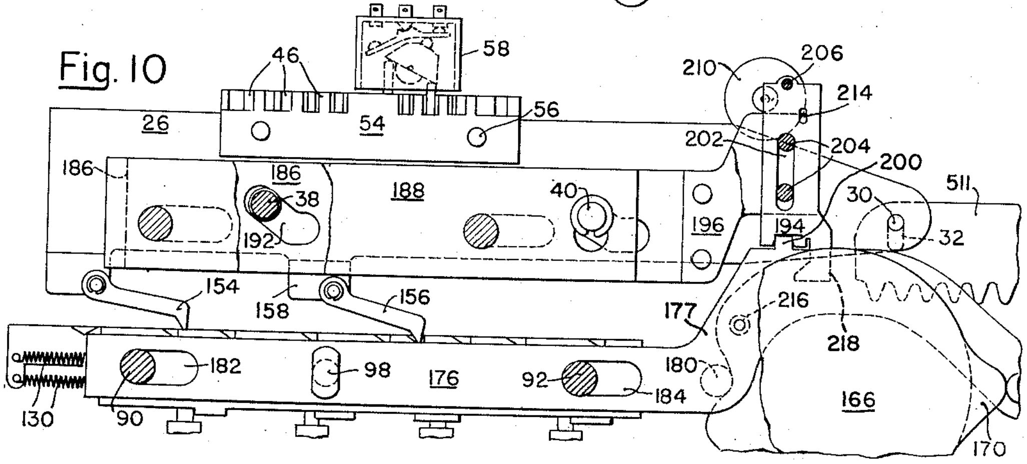
FIG. 10 is a view similar to that shown in FIG. 9 but illustrating the parts of the mechanism in sensing relationship.

A comparison of FIGS. 9 and 10 show the positions assumed by the sensing and reset slides and their associated elements. In FIG. 9 the sensing slide 186 is disengaged from the reset slide 176 and the latter alone is reciprocated by the cams 166—166. In this position of the parts the slide member 26 and coded sensing plates 48—54 are in their lowermost non-sensing position. When coupled by the latch 194 to the reset slide, the sensing slide is moved forwardly therewith and at its furtherest forward movement it assumes the position shown in FIG. 10. In this position the bails 38 and 40 are caused to be lifted by the sloping edges of the inclined slots 192—192 raising the slide member 26 and bringing the coded plates 48—54 into sensing engagement with the depending plungers of the switches in the switch bank 58. The elevated relationship of the slide member 26 with respect to the coded notched slides 76—82 is apparent in FIG. 10. It is evident, however, if pawl 154 or 156 should be engaging a registering transverse group of notches that even in this elevated condition the pawl will continue to engage the notches and hold the slide member and its associated actuator bar 511 from forward advancement. It is also evident in FIG. 10 that although the slide member 26 and its associated parts have been raised with respect to the actuator rack 511, this movement is not transmitted to the latter because of the pin and slot connection 30 and 32 therebetween. It is also evident in FIG. 10, assuming clockwise rotation, that the pin 216 will shortly abut the foot 218 of the latch to raise the latch and disconnect the sensing slide from the reset slide.

When it is desired to sense that which is entered into the machine by the keys 256 of the keyboard (FIG. 1), the two sensing solenoids 210—210 are pulsed simultaneously, allowing the latches 194—194 to engage the projections or lugs 200 on the reset slides 176—176. Prior to this movement the slide member 26 of each print set has gone forward with its respective actuator rack 511 until it is stopped either at the extreme end of its forward travel or by the interposition of a stop shoulder 509 of a differential stop sector 491 as explained in the aforesaid Patent No. 2,629,549. Which of the ten stop shoulders presented to arrest the movement of the actuator rack 511 is determined by the depression of the selected key 256 of the keyboard acting through the differential stop slide 483 as described in the above mentioned patent. In the dwell period after the actuator 511 and associated slide member 26 have been stopped, the cams 166—166 move the reset slides forward, which, if the sensing slide is coupled through the latch mechanism thereto, moves the sensing slide therewith and raising the bails 38 and 40 and the sensing plates 48—54 into engagement with the switch plungers. Toward the end of the machine cycle, the latches 194—194 are lifted by the pins 216 on the cams and caused to be cocked by the engagement of the pole pieces 212 of the solenoids 210 therewith. If sensing is not desired, the latching solenoids 210—210 are not energized and the sensing and reset slides are maintained out of engagement.

When it is desired to read-in information to the machine, an electrical current impulse is applied to selected ones of the solenoids 60—66 causing their respective pole pieces 152 to retract and allowing the notched slide cocked thereby to be pulled to triggered position by its spring 130. As previously described, this serves to arrest the movement of the slide member 26 and its associated actuator rack in a position representing the input data indexed thereinto. This will set the type bar 562 in position to print the number representing the input data. Resetting of the coded slides 76—82 takes place during the dwell of the actuator rack 511 and is caused by the cams 166—166 which act through the reset bail 98 to return the coded slides to cocked position. Thereafter the reset bail is returned to its rest position by the cams freeing the coded slides for movement to triggered position when their respective solenoids 60—66 are energized.

Heretofore a single machine having both an input mechanism and an output mechanism has been described. In the transmission system hereinafter described two or more machines of this general character are employed to control one another. Although the illustrated embodiment of the invention envisualizes two machines each having both a read-in mechanism and a read-out mechanism of the character described herein, it is to be understood that one machine may have a read-out mechanism only and the other machine may have a read-in mechanism only.

Figure 14:
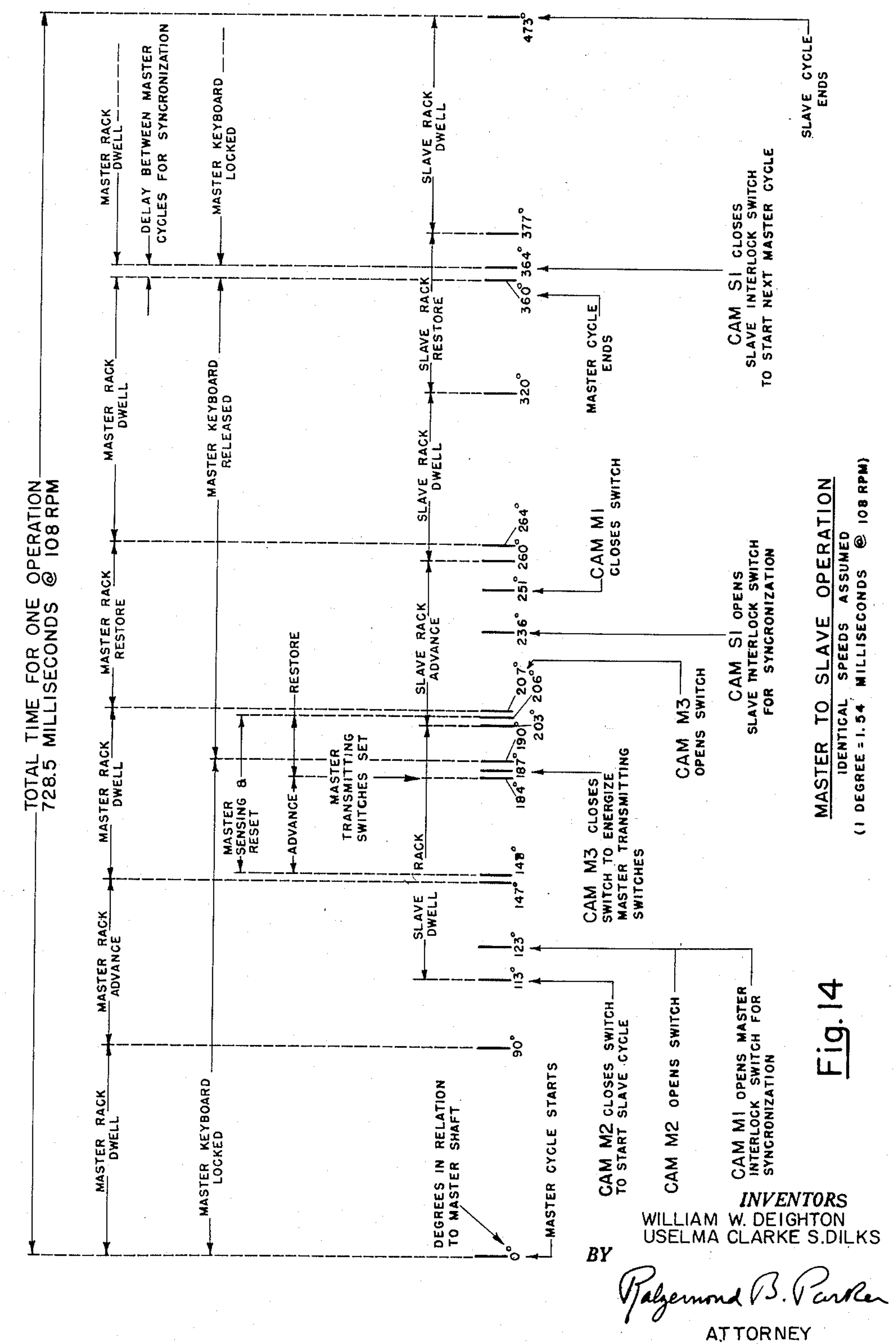
FIG. 14 is a schematic view illustrating a timing diagram showing the time sequence of the operation of the various elements of a master-slave system arrangement in accordance with this invention.

A bi-directional data transmission system embodying features of the invention is illustrated in FIGS. 13 and 14 and comprises two machines 10 and 12 of the character described operatively connected together by a cable 14. Each machine 10 and 12 may be similarly constructed and equipped with substantially identical coded slide rack-stop mechanisms, transmitting switches and sets of control cams and switches. One machine known as the Master and indicated at 10 converts mechanical position to electrical signals and transmits this information in this form over the cable 14 to control the other machine identified as the Slave machine 12. By means of a switch on the Master machine the functions of the two machines can be reversed and the remote machine becomes the Master and controls the other.

FIG. 13 shows the basic wiring diagram for a data transmission system constructed in accordance with this invention. On the left is the wiring associated with the Master machine 10 including the operation selecting switch 220 and motor bar switch 222. The wiring of the Slave machine 12 is on the right of FIG. 13 and the two are connected with the cable 14. For Master to Slave operation the selective switch 220 is thrown to the "Master-to-Slave" position. Having previously indexed information into the Master keyboard and set up keyboard stops for the actuator racks, the motor bar 222 is depressed and the Master motor solenoid is energized through the selecting switch 220, line 224 and the switch operated by Slave cam S1. Thereafter, the Master cycle starts. A short time later Master cam M2 closes a switch 226 to energize the Slave motor solenoid through the interlock switch 228 of cam M1 which is held closed by the cam. This causes the start of the Slave cycle. Cams M1 and M2 then open their switches to prevent the next Slave cycle from starting too soon and to remove the current from the motor solenoid. The Master actuator racks, identified as racks 1–12, reach their dwell and the sensing action provided by the slide members 26 sets the Master transmitting switches 58 in accordance with the position of the actuator racks. Cam M3 then closes its switch 230 to read the transmitting switches and energize, through the connecting cable, the appropriate Slave slide solenoids which index the coded slides 76—82. Thereafter, the Slave rack motion takes place; the actuator racks are positioned by the notched slides 76—82 and by either of the pawls 154 or 156, and the information from the keyboard of the Master is now in the crossfooter of the Slave. The Master actuator racks then restore and interlock cam M1 closes its switch in preparation for the next Slave cycle. The Slave actuator racks then restore. The Master cycle ends and cam S1 closes the interlock switch for the next Master cycle. The Slave cycle ends and the system is ready for the next operation.

When it is required to call the information back from the Slave to the Master, the selecting switch 220 is thrown to the "Slave-to-Master" position and the motor bar 222 on the Master initiates the operation. The Slave now controls the Master in the same manner as described above, cams S2 and S3 being used in place of M2 and M3.

FIG. 14 is the timing chart for the data transmission system of FIG. 13 and shows the relationship between the motions of the Master and Slave actuator racks and control cams for one complete operation from the start of the Master cycle to the completion of the Slave cycle. This timing chart is based on both machines operating at a nominal speed of 108 cycles per minute, but the control cams are designed so as to maintain synchronization over a range of speeds of either machine from 106 to 110 cycles per minute.

In "Master to Slave" operation the first cam to operate is Master cam M2 which starts the Slave cycle. The criterion for the design of this cam is that the Slave rack should not begin its advance before the Slave slides are indexed regardless of the speed of either machine. Since this rack advance starts at 90° in the Slave cycle, the Slave cycle can be started early in the Master cycle provided the above condition is satisfied. It is necessary, therefore, to consider first the Master operating at 106 cycles per minute to make sure that it will reach the proper point in its cycle ahead of the Slave, and the Slave operating at 110 cycles per minute to obtain the earliest time in its cycle that its rack starts to move. Should the cam be calculated from the fastest Master and the fastest Slave, it would be found that at slower Master speeds, the Slave slides would be indexed after the rack and started its forward motion.

Considering the Master operating at 106 cycles per minute of 1.57 milliseconds per degree, after 288.7 milliseconds operation of the Master cycle the transmitting switches are set and may be energized by cam M3. Allowing 15 milliseconds for the Slave slide solenoids to operate and index the slides, and 10 ms. for safety margin, the Slave rack can start its advance at 313.7 ms. However the Slave cycle can have started 90° prior to this point, or 136 milliseconds for a Slave speed of 110 cycles per minute or 1.51 ms. per degree. Therefore:

313.7 ms.=Slave rack advance time.
136.0 ms.=Duration of initial Slave rack dwell.

177.7 ms.=Time in Master cycle for Slave cycle to start.

$$\frac{177.7\text{ ms.}}{1.57\text{ ms. per degree}}=113°\text{ circuit closing point of cam M2.}$$

The circuit opening point of cam M2=123° or 15.7 milliseconds later, allowing time for the motor start mechanism to function.

Cam M3, which energizes the Master transmitting switches 58, can do so only after they have been set by the reset cam lifting the coded sensing plates. This lifting action is completed at 184° of Master rotation. The cam is designed to close its circuit at 187° which allows 3° safety margin. The circuit opening point is made at 207°, or 30 milliseconds later at 1.51 ms. per degree to make sure that the slide solenoids 60—66 of the Slave are energized long enough for their pole pieces to clear the slide stop ears while the slides are positioning themselves.

The interlock cams M1 and S1 are necessary to maintain synchronization during continuous recycling by assuring that the Slave's cycle is ended before the start of the next Master cycle. Otherwise the Slave machine would be indexed during Slave rack motion. The design of these cams is determined by considering the fastest Master and the slowest Slave. The master, at 110 cycles per minute, turns through 113° of its cycle in 170.7 milliseconds, at which point cam M2 starts the Slave cycle. The Master continues to 184° in 278 milliseconds, and 25 milliseconds later at 303 milliseconds the Slave slides are indexed. Meanwhile the slow speed Slave is rotating through its 90° initial dwell and its rack advance begins after 312 milliseconds of Master operation. The Master completes its cycle of 360° in 544 milliseconds, and if caused to recycle immediately, will reach the 113° point for starting the next Slave cycle after 715 milliseconds. However, the Slave having started at 170.7 milliseconds is completed, at the rate of 1.57 ms. per degree, at 736 milliseconds. Thus the Master is calling for the next Slave cycle 21 milliseconds too soon, and so the Slave interlock cam S1 acts to delay the Master by 21 ms. minimum and not allow it to recycle til 565 milliseconds. The circuit closing point of Cam S1 must be 394.3 milliseconds after the start of the Slave cycle which is the difference between 565 ms. (starting time for next Master cycle) and 170.7 ms. (delay in start of Slave cycle). At the rate of 1.57 ms. per degree this is 251° rotation of the Slave.

The circuit opening point of the interlock cams is based on the requirement that the data transmission system may be operated with either the Master controlling the Slave or the Slave controlling the Master. In either case the Master motor solenoid circuit is completed through the Slave interlock cam S1 by the motor bar and the Slave motor solenoid circuit is completed through the Master interlock cam M1 by the Slave start cam M2 on the Master, forming symmetrical circuits for operation in either direction. Therefore the interlock cams must keep their circuits closed to 123° while the start cams function. Since the Master and Slave circuits are symmetrical for bidirectional operation, the cams for one are the same as the other.

What is claimed is:

1. A data storage and read out mechanism comprising a plurality of storage devices, each of said storage devices having two discrete storage positions and being selectively operable into either one thereof, a plurality of means for selectively sensing one or the other of said discrete positions, said selective sensing means constituting separate operative groups wherein each group is representative of a separate bit of information, means for supporting said selective sensing means in parallel spaced apart relation, said supporting means being adapted to move conjointly with an actuator rack of a business machine, a plurality of electromagnetic means supported adjacent and in fixed relationship to said actuator rack, a plurality of slidably displaceable slides, pawls disposed on said supporting means adapted to move over said slides and selectively engage discrete aligned portions of said slides, means under the control of a data source for energizing said electromagnetic means for rendering them effective to adjust the position of said slides to thereby vary the position of the discrete aligned portions thereof, and means operative for restoring said displaced slides to an initial reset position.

2. A data storage and read out mechanism comprising separate electromagnetic means adapted to receive information in increments of the binary code, a plurality of notched slides with each notch constituting a separate operative member wherein the same relative notch of each slide is representative of the same binary increment, means for supporting said slides for movement in parallel planes, said electromagnetic means being mounted adjacent to said slides so that separate ones of said slides are reciprocable alongside of separate ones of said electromagnetic means, means responsive to a data source for energizing said electromagnetic means, means responsive to the energization of said electromagnetic means for causing its respective slide to be moved to vary its position with respect to the other slides, and means for sensing the notches of said slides.

3. A data storage and read out mechanism comprising, a plurality of electromagnets, a plurality of selectively displaceable coded position indicating plates supported for movement in parallel planes over said electromagnets, means engaging said indicating plates and urging the same to move in one direction, means releasably holding said plates from movement, means responsive to said electromagnets controlling said releasable means and effective upon energization to release the plates for movement, means mounted for movement over said plates for detecting displacement thereof, and means operative for restoring a displaced one of said plates to a reset position.

4. In an accounting machine, means for positioning apparatus to represent intelligence information indexed into the machine, comprising, a movable member having rows of alternate notches and projections along one edge thereof, means for differentially positioning said member from a starting position to a position representative of a selected first character, switch means, said switch means having multiple stable switch positions and an actuator including movable elements for setting said switch means from one to another of said stable positions, cam means for engaging a notch and a projection of said movable member with the movable elements of said actuator thus to set the switch means to a selected stable position, electrical means for sensing the position of said switch means, a plurality of elongated members, each of said elongated members having stop means thereon, means to drive said elongated members in one direction independently of one another, means to return each of said members to a starting position, means adjacent to each of said elongated members for arresting each of said members in its starting position, means responsive to the electrical sensing of said switch means to release said members to assume a position representative of a second character, means for urging said arresting means into engagement with the stop means of an associated member, and means on said movable member operable during subsequent movement thereof to sense the arrested position of said elongated members thereby to position said movable member in accordance with said second character.

5. In a system of the class described, a movable member having a plurality of rows of notches and projections along one edge thereof, means for differentially positioning said movable member from a starting position to a position representative of a selected decimal value, switch means, said switch means having multiple stable switch positions and rockable actuator means for setting the switch means from one to another of said stable positions, means for engaging at least one notch and one projection with said actuator means thereby to cause said actuator means to set said switch means to a selected stable position, a plurality of elongated members, each of said elongated members having stop means thereon, means to drive said elongated members in one direction independently of one another, means to return each of said members to a starting position, means arresting each of said members in said starting position, means to release said members for movement in a direction to assume a position representative of a binary value, means for urging said arresting means into engagement with the stop means of an associated member, and means on said movable member operable during subsequent movement thereof to sense the arrested position of said elongated members thereby to reposition said movable member in accordance with said binary value.

6. Accounting apparatus comprising a Master accounting machine and a Slave machine, each machine having a means to drive it through cycles of operation, a corresponding plural order series of differential actuators each movable between a normal position and any of a series of differential positions, means driven by the drive means of the respective machine to advance its differential actuators to differential position and again return them to normal position in a cycle of operation of the respective machine, and differential stop means to arrest the differential actuators of the respective machine in any selected ones of their differential positions, said apparatus further comprising a settable static memory means for each of said differential actuators of the Master machine, each of said memory means including a switch having multiple stable switch positions capable of holding a selected switch position for at least the duration of a cycle of operation of the Master machine, means operated by the drive means of the Master machine while the differential actuators of the Master machine are in differential position to set the switches of said memory means in accordance with the differential positions of the latter actuators, cycle-initiating electrical circuit means operable under control of the drive means of the Master machine to initiate a cycle of operation of the Slave machine, and indexing electrical circuit means controlled by said static memory means to operate the differential stop means of the Slave machine to arrest the differential actuators of the latter in differential positions determined by the setting of the switches of said memory means.

7. An input device for an accounting machine comprising, an actuatable member differentially settable to positions indicative of numerical values, a plurality of movable slides mounted in parallel side by side relation each slide bearing a series of code identifying notches in one edge portion thereof, a fixed slide parallel to said movable slides bearing notches in an edge portion thereof alignable with the code identifying notches of said movable slides, means biasing said movable slides in one direction, stop means on each of said movable slides, a plurality of electromagnets one for each movable slide, each said electromagnet including a movable armature engageable with the stop means on a respective movable slide and being adapted to release said slide for movement in the biased direction to cause certain of the notches in the movable slides to register with one of the notches in the fixed slide, pawl means carried by said actuable member, said pawl means being receivable in said notches when certain of the notches of said movable slides are in register with each other and with a notch in said fixed slide thus to set said movable slides in positions corresponding to a numerical value determined by said electromagnets, means to drive the actuatable member relative to said slides causing said pawl means to engage and seat in the registered notches of the movable slides and the fixed slide thus to arrest the actuatable member in a selected one of its differentially settable positions corresponding to the numerical value set in said movable slides.

8. In an accounting machine coding apparatus comprising, a plurality of actuator members, means to differentially move said members to positions indicative of different character values, an extension movable conjointly with each of said actuator members, each said extension carrying a plurality of coded plates, a plurality of switch bodies, one switch body for each of said actuator members, each of said switch bodies including a plurality of multi-position switches each having multiple stable switch positions for coding values therein, said plates being adapted to set each switch from one to another of its stable positions, oppositely disposed fixed supporting members, each supporting member including a plurality of slots therethrough, a pair of bails receivable through said slots, a pair of slides, each slide having a pair of camming apertures through which said bails are received, a latch for each bail, reset means for said bails, electromagnetic means for actuating the latch for each bail and including means coupling said slides to said reset means for conjoint movement therewith, and drive means engaging said reset means for camming said slides in a direction to bring said plates into engagement with said switch setting means whereby each of said switches is set to a selected stable switch position corresponding to a desired character value.

9. In an accounting machine, the combination comprising, a plurality of actuator racks, means responsive to the actuation of manually controllable members for moving said racks from a starting position to positions representative of the numerical value of the member actuated, a plurality of groups of elongated slides, one edge portion of each slide in each group having notches therein in a binary code, the opposite parallel edge portion of each slide having a stop member projecting away therefrom, a rack extension for each of said racks, a plurality of detents carried on each rack extension and operably engageable with said notches when the notches are transversely aligned for arresting movement of said slides in one direction, electromagnet means for each slide including an arresting member actuated thereby for engaging a respective slide stop member for arresting the movement of said slides in an opposite direction from said one direction, spring means for moving each slide to a triggered position wherein certain of said notches are transversely aligned with one another for arresting engagement with one of said detents, reset means for moving said slides to a cocked position wherein the stop member of each slide is arrestingly engaged by a respective arresting member of its associated electromagnetic means, and drive means for moving said reset means from an uncocked to a cocked position.

10. In an accounting machine, the combination comprising, a plurality of actuator racks, means to differentially move said racks to positions corresponding to numerical characters, a rack extension for each of said racks, each rack extension including means permitting movement thereof in a plane perpendicular to the plane of movement of said racks, a plurality of switch bodies, one switch body for each of said racks, each switch body including a plurality of multi-position switches each having multiple stable switch positions, means setting said switches from one stable position to another, a first plurality of elongated planar members secured along one side edge portion of each rack extension, a second plurality of similar elongated planar members secured along the opposite side edge portion of each rack extension in parallel side by side relation to said first plurality of planar members, each of said planar members having multiple spaced projections thereon extending away therefrom, a plurality of bail members, each of said rack extensions being provided with a plurality of apertures for slidably receiving said bail members therethrough, and drive means engaging said bail members and including cam means for moving said bail members perpendicularly relative to said racks thus to move the planar members toward the switches so that certain of the projections of said planar members engage certain of said switch setting means thereby to set said switches in selected stable positions corresponding to the numerical characters indexed into said rack.

11. A data transmission system for accounting machines comprising, a plurality of switches, each having at least two distinct data storage conditions and including means for selectively actuating the switches from one to the other of said conditions, whereby constant or changing data may be transmitted from said accounting machine by way of said switches, electromagnetic data input means supported adjacent to but spaced from said switches, said electromagnetic means including a plurality of slides movable relative to each other in parallel planes, means for so moving said slides, stop means on said slides, and a similar plurality of electromagnets cooperable with said stop means to align selected discrete portions of said slides in positions indicative of values transmitted into the accounting machine by way of said electromagnets, movable actuator means positioned within the space between said switches and said slides, said actuator means including a plurality of coded projections facing said switches, and pawl means riding on said slides and movable during an accounting machine cycle to engage said discrete aligned portions of said slides, thus to stop said movable actuator means in a position indicative of the value set in said slides by said electromagnets, and means to move the projections of said movable actuator means against said switch actuating means thus to set the value represented by the position of said movable actuator means into said switches.

12. A data transmission system operable by the differentially movable members of an accounting machine comprising, a plurality of storage devices, each including a plurality of switches each switch having at least two distinct data storage conditions and including means for selectively actuating the switches from one to the other of said conditions, whereby constant or changing data may be transmitted from said accounting machine by way of said switches, a plurality of electromagnetic data input means, each data input means being supported adjacent to but spaced from said one of said storage devices, including a plurality of slides movable relative to each other in parallel planes, means for so moving said slides, stop means on each of said slides, and electromagnets cooperable with each of said stop means to align selected discrete portions of said slides and being indicative of a value transmitted into the accounting machine by way of said electromagnets, a movable extension of each of said differentially movable members positioned within the space between said switches and said slides, each extension including a plurality of coded projections facing said switches, and pawl means carried by said extension and riding on said slides and movable by the differentially movable member of the accounting machine during a machine cycle to engage said discrete aligned portions of said slides, thus to stop said differentially movable members in positions indicative of the values set in said slides by said electromagnets, and means to move said projections of the movable extensions against said switch actuating means thus to set the values represented by the positions of said differentially movable members into said switches.

13. An input device for an accounting machine, comprising an actuator rack differentially settable to positions indicative of numerical values, an auxiliary rack movable conjointly with said actuator rack, a plurality of movable slides mounted in parallel side by side relation each slide bearing a series of code identifying notches in one edge portion thereof, a fixed slide parallel to said movable slides bearing notches in an edge portion thereof alignable with the code identifying notches in said movable slides, means biasing said slides in one direction, stop means on each of said movable slides, a plurality of electromagnets one for each movable slide, each said electromagnet including a movable armature engageable with the stop means on a respective movable slide and being adapted to release said slide for movement in the biased direction to cause certain of the notches in the movable slide to register with one of the notches in the fixed slide, a pair of pawls carried by said auxiliary rack, one of said pawls being receivable in said notches when certain of the notches in said movable slides are in register with each other and with a notch in said fixed slide thus to set said slides in positions corresponding to a numerical value determined by said electromagnets, means to move the auxiliary rack relative to said slides causing one to engage and seat in the registered notches of the movable slides and the fixed slide thus to arrest the actuator rack in a selected one of its differentially settable positions corresponding to the numerical value set in said movable slides.

References Cited in the file of this patent

UNITED STATES PATENTS

| | | |
|---|---|---|
| 779,223 | Kotyra | Jan. 3, 1905 |
| 1,005,555 | Kettering | Oct. 10, 1911 |
| 2,307,153 | Nichols | Jan. 5, 1943 |
| 2,332,755 | Robertson et al. | Oct. 26, 1943 |
| 2,497,784 | Mehan et al. | Feb. 14, 1950 |
| 2,550,133 | Allan | Apr. 24, 1951 |
| 2,603,702 | Kern | July 15, 1952 |
| 2,772,048 | Collison et al. | Nov. 27, 1956 |
| 2,812,902 | Runde et al. | Nov. 12, 1957 |

FOREIGN PATENTS

| | | |
|---|---|---|
| 690,171 | Great Britain | Apr. 15, 1953 |